Aug. 5, 1958 J. FOLK 2,845,970
SLICING MACHINE HAVING A SLICE THICKNESS ADJUSTING MEANS
Filed Jan. 21, 1954 3 Sheets-Sheet 1

INVENTOR:
JOSEPH FOLK
BY
Margall, Johnston, Cook & Root.
ATT'YS

Aug. 5, 1958 J. FOLK 2,845,970
SLICING MACHINE HAVING A SLICE THICKNESS ADJUSTING MEANS
Filed Jan. 21, 1954 3 Sheets-Sheet 2
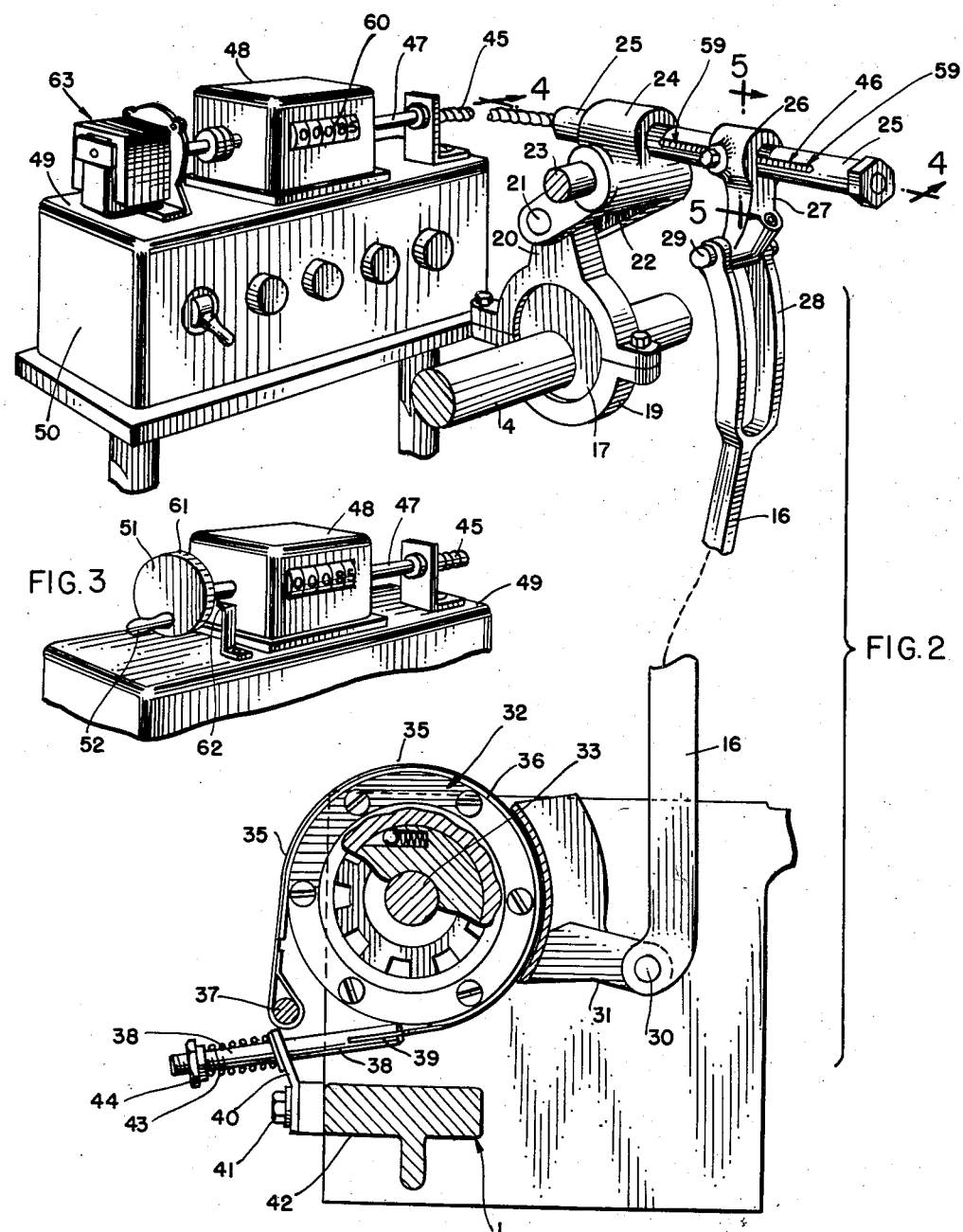
INVENTOR:
JOSEPH FOLK
BY
Margall, Johnston, Cook & Root
ATT'YS Aug. 5, 1958 J. FOLK 2,845,970
SLICING MACHINE HAVING A SLICE THICKNESS ADJUSTING MEANS
Filed Jan. 21, 1954 3 Sheets-Sheet 3
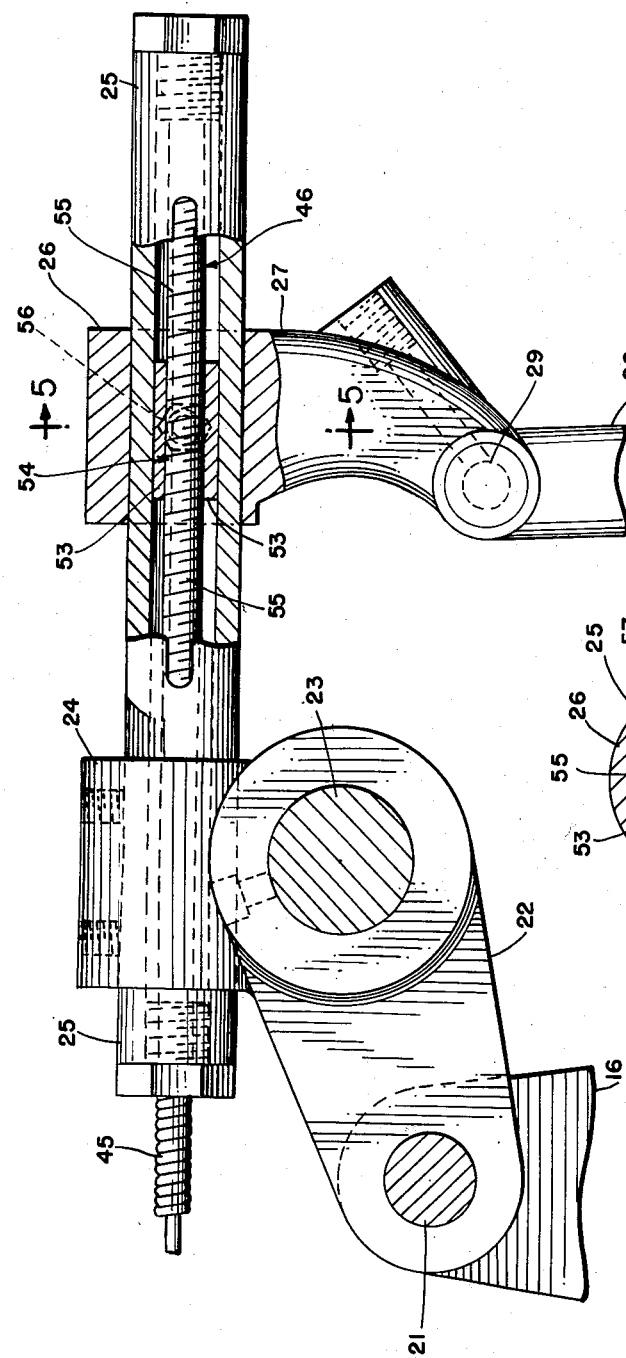
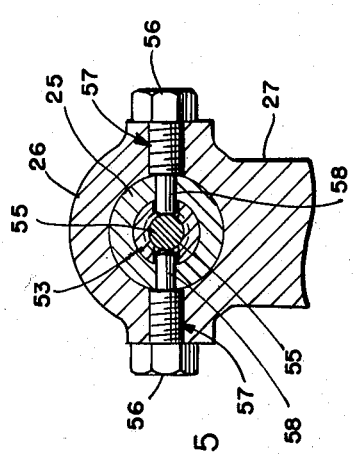
INVENTOR:
JOSEPH FOLK
BY
Margall, Johnston, Cook & Root.
ATT'YS

United States Patent Office 2,845,970
Patented Aug. 5, 1958

2,845,970

SLICING MACHINE HAVING A SLICE THICKNESS ADJUSTING MEANS

Joseph Folk, La Porte, Ind., assignor to U. S. Slicing Machine Company, Inc., La Porte, Ind., a corporation of Indiana Application January 21, 1954, Serial No. 405,419

3 Claims. (Cl. 146—95)

This invention relates to slicing machines in general and particularly that type of slicing machine wherein slices of a predetermined thickness are cut by a revolubly mounted slicing knife and then deposited upon a continuously moving conveyor to cause the slices to be arranged in overlapping relation or shingle fashion.

The broad adaptation of the invention consists in an adjustment for the driving means of a food pusher or gripper, the gripper being moved in step-by-step relationship, the distance between the steps of the forward feeding movement of the pusher being equal to the thickness of a slice to be cut from a substance such as a slice from a slab of bacon. Driving means, including a slip clutch, are provided to effect the step-by-step movement of the pusher. This application is a continuation-in-part of applicant's copending application Serial No. 283,804, filed April 23, 1952, now abandoned in favor of applicant's continuation application Serial No. 487,088, filed February 9, 1955.

Specifically, the present invention consists in the adjustment of a member slidably mounted on a horizontal rod reciprocating in a vertical arc to adjust the distance of travel of a vertically oscillating clutch driving arm, the adjustment occurring remote from the slidable member and remote from the oscillating member to drive the clutch while the horizontal rod and other operating parts of the machine are still in motion.

The primary object of the present invention is the provision of a slicing machine which is provided with an adjusting means to effect adjustment of a sleeve on a continuously reciprocating horizontal member to change the arc of travel and thus change the amount of vertical travel of a vertical arm which is pivotally connected to the horizontal member and driven thereby.

Another object of the present invention resides in the provision of a new and improved means for effecting longitudinal or axial slidable movement along a horizontally reciprocating rod to effect the amount of vertical reciprocation or oscillation of a vertically disposed rod which is operatively connected to, and controlled by the reciprocation of, the horizontally reciprocable member.

A further object of the invention consists in the provision of a new and novel means for effecting adjustment of a vertical reciprocating member driven by a horizontal reciprocating member while such members are in motion.

A still further object consists in the provision of shifting a slide collar on a constantly reciprocating rod or arm to effect the throw of movement of a vertical member driven by the horizontal rod or arm while said latter arm is in continuous reciprocating movement.

Numerous other objects and advantages will be apparent throughout the progress of the specification which follows.

The accompanying drawings illustrate a selected embodiment of the invention and the views therein are as follows:

Fig. 2 is an enlarged detail perspective exploded view, partly in section, of certain parts showing the manner in which the drive shaft is driven by a horizontally reciprocating rod and the mechanism for causing reciprocation of the horizontal rod and including a motor-driven mechanism for electrically controlling the thickness of slices to be cut and for giving a visual indication thereof;

Fig. 3 is a detail perspective view of the part of an adjusting mechanism which may be hand operated and which visually shows the thickness of a slice to be cut according to the movement given the drive collar on a horizontally reciprocating rod;

Figure 1:
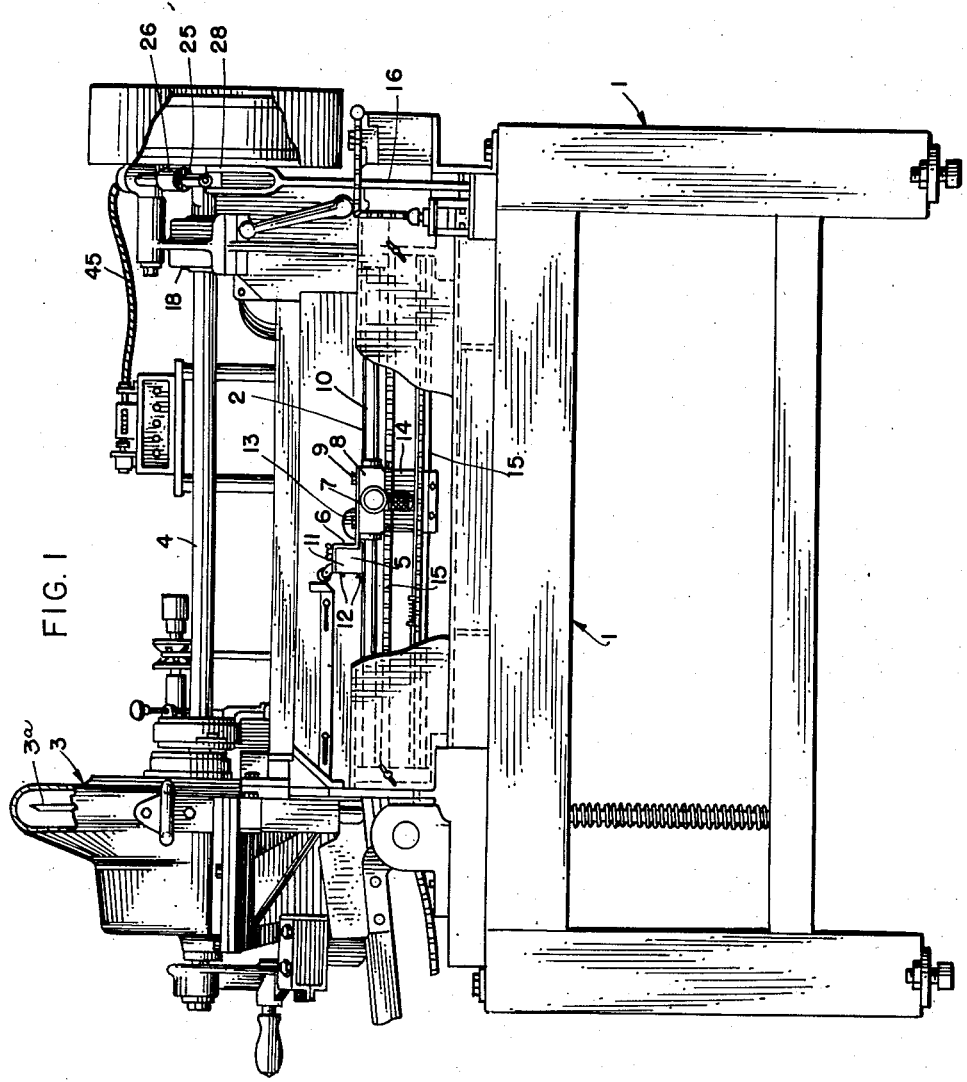
Fig. 1 is a detail side elevational view of a bacon slicing machine and embodying the present invention.

Fig. 4 is an enlarged detail longitudinal sectional view on the line 4—4 of Fig. 2; and Fig. 5 is a detail transverse sectional view on the lines 5—5 of Figs. 2 and 4.

The construction herein shown for the purpose of illustrating the invention shows the parts associated with a bacon slicing machine of the well known type manufactured by the U. S. Slicing Machine Company, Inc., of La Porte, Indiana.

The slicing machine comprises a suitable supporting frame 1, Fig. 1, upon which the various elements are mounted. The frame 1 supports a feed table 2 upon which substance is to be fed in step-by-step relationship toward a slicing knife 3a arranged within a knife housing 3 to have slices cut from the substance. The slicing knife is driven by a knife shaft 4 which is revolubly mounted in suitable bearings. The shaft 4 is driven by an electric motor (not shown) at a high rate of speed.

Substance is fed along the top of the feed table 2 by means of a pusher which, in the present instance, comprises a gripper 5. The gripper 5 is preferably of the type disclosed in applicant's copending application, Serial No. 283,804, entitled Slicing Machine Meat Gripper, filed April 23, 1952. The gripper 5 is mounted on an upstanding arm 6 which is part of an integral horizontal plate 7, Fig. 1. The plate 7 is connected to a sleeve 8 by means of fastening screws 9, Fig. 1. The sleeve 8 is mounted on a longitudinal slide rod 10 which has its ends connected to, and supported by, rigid parts of the frame structure 1. The gripper 5 includes a casing 11 having openings provided in its front face through which openings upper and lower impaling prongs 12 extend to impale and secure a piece of substance along the feed table top 2.

The gripper 5 is supported on one side by the connection of the plate 7 to the sleeve 8, and on its other side by a roller 13 which is pivoted to an upstanding plate (not shown) integral with the plate 7.

The sleeve or boss 8 has rigidly connected thereto, a channel-shaped member 14 which is arranged below the table top 2. The channel 14 includes a downwardly projecting part to which a drive chain 15, Fig. 1, is connected. The chain 15 is driven from mechanism operated by the rotating knife shaft 4.

Drive means are provided for driving the gripper 5 by the chain 15. This drive means, Fig. 2, comprises an oscillating or vertically reciprocating arm 16 which is operated directly by the knife shaft 4. The knife shaft 4 has an eccentric 17 mounted thereon which is arranged in casing 18, Fig. 1. The eccentric 17, Fig. 2, is surrounded by an eccentric strap 19 having an arm 20 which is pivoted at 21 to a clevis or yoke 22. The yoke 22 is pivotally mounted on a rod 23 which is connected to a rigid part of the slicing machine frame. The yoke 22 includes a boss-like sleeve 24 which receives a transverse reciprocating horizontal rod or arm 25. Rotation of the knife drive shaft 4 causes the arm or rod 25 to reciprocate in a vertical arc. The reciprocating arm or rod 25 receives a sleeve or boss 26 which is shiftably adjustable longitudinally on the rod 25. The sleeve 26, which surrounds the reciprocating arm 25, has a downwardly extending arm 27 to which the bifurcated end 28 of the oscillating arm 16 is pivoted as indicated at 29, Fig. 2. Rotation of the shaft 4, therefore, causes vertical reciprocation or oscillation of the arm 16.

The arm 16, Fig. 2, has its lower end pivotally connected at 30 to a clutch arm 31 of a drive clutch member 32, which is revolubly, but loosely mounted on a longitudinal drive shaft 33. The clutch 32 is such that vertical reciprocation of the oscillating rod 16 will cause the drive clutch 32 to rotate in step-by-step movement about the normally stationary drive shaft 33 upon which the clutch member is mounted. Vertical reciprocation of the rod 16 causes driving step-by-step or intermittent rotative motion of the clutch member 32 in one direction but non-driving free rotative movement in its opposite direction. A brake band 35, Fig. 2, surrounds a surface of an annular part 36 of the clutch member 32 to prevent rotation of the clutch member in one direction but allowing rotation of the clutch member in the other direction. The reciprocating or oscillating arm 16, therefore, has a vertical pumping action with respect to the clutch member 32 to permit rotative movement in short increments of the clutch member 32 about the normally stationary shaft 33. The particular construction of the oscillating arm 16, and the manner in which it causes intermittent rotative movement of the clutch member 32 and the drive shaft 33 is described and claimed in applicant's copending application, Serial No. 283,804, filed April 23, 1952, for Slicing Machine, and assigned to the present assignee.

The brake band 35 has its lower end looped and surrounds a fixed pin 37. The other end of the brake band 35 is connected to a rod 38 as indicated at 39, Fig. 2. This short rod 38 extends through a bracket 40 which is secured by a bolt 41 to a rigid cross member 42 of the main frame 1. A coiled spring 43 surrounds the protruding part of the pin 38 between the bracket 40 and the nut 44 to provide a resilient connection with one end of the brake band 35. Therefore, rotation of the member 36 in one direction is locked by the brake band 35 but is free to move in a reverse direction by means of the flexible connection at its other ends by means of the spring surrounding the short rod 38 as clearly shown in Fig. 2.

The drive shaft 33 has a sprocket (not shown) at one of its ends to drive the chain 15 in step-by-step movement according to the intermittent rotative movement of the shaft 33. An idler sprocket (not shown) is located adjacent the forward end of the machine over which the chain 15 trains.

The invention has to do mainly with adjusting the sleeve 26 on the rod 25, which reciprocates in a vertical arc. The main object is to permit such longitudinal adjustment of the sleeve 26 on the rod 25 while the rod 25 is reciprocated. The means for effecting the adjustment longitudinally of the sleeve 26 on the rod 25 comprises a relatively long flexible adjusting rod 45, Figs. 1 to 4. The rod 25 is cylindrical, that is, it is hollow throughout practically its entire length and thereby has an elongated cylindrical bore 46 into which bore the rod 45 is received. One end of the resilient adjusting rod 45 (to the right, Figs. 2 and 3) is connected to a rod 47 which is revolubly mounted in a casing 48 mounted on a platform 49 of an element 50 supported to a rigid part of the slicing machine supporting frame 1. This rod 47 extends completely through the casing 48 and is rigidly connected to a disc-like member 51, Fig. 3. A handle 52 is connected to the disc-like member 51 near the periphery thereof for the purpose of rotating the rod 47. Operation of the handle 52, therefore, causes rotation of the disc-like member 51 which in turn rotates the rod 47. Inasmuch as the resilient rod 45 is fixed to the rod 47, the resilient rod 45 will rotate whenever the rod 47 is rotated. Operation of a handle 52, therefore, causes rotation of the flexible rod 45 within the longitudinal bore 46 of the rod 25.

A cylindrical sleeve comprising an internally threaded nut 53 is slidably mounted in the bore 46, Figs. 4 and 5, and has an internally threaded bore 54 to receive threadedly a threaded stem 55 which is connected to the free end of the resilient rod 45. A pair of opposed threaded members or bolts 56, 56, Fig. 5, pass through threaded bores 57, 57 in the sleeve 26 and have relatively smooth rod ends 58, 58 which extend through opposed longitudinal slots 59, 59 in the rod 25, Fig. 2. The ends 58 of the bolts 56 also pass through the slidable sleeve or nut member 53, Fig. 5. Therefore, rotative movement of the flexible rod 45 will cause longitudinal translation of the sleeve-like nut member 53, and inasmuch as this member 53 is connected to the sleeve 26, the sleeve member 26 will be caused to translate longitudinally along the reciprocating rod 25. Rotation of the handle 52, therefore, will cause rotation of the threaded stem 55 and translate the nut-like member 53 and the sleeve 26 longitudinally along the reciprocating rod 25. The farther out the sleeve 26 is positioned on the rod 25, the greater will be the vertical movement of the oscillating drive arm 16. Conversely, however, the closer the sleeve 26 is moved toward the boss-like sleeve 24, that is, inwardly of the rod 25, the less vertical reciprocation will be given to the oscillating arm 16. The position of the sleeve 26 on the rod 25, therefore, determines the distance the vertical oscillating arm 16 will move. The farther out the sleeve 26 is located, the greater will be the arc of travel on the rod 25. Therefore, the movement of the vertical arm 16 will be increased. Inward movement of the sleeve 26 on the rod 25 will result in a lesser arc, and therefore the distance that the arm 16 must travel will be diminished or lessened. The vertical reciprocation or oscillation of the arm 16 causes rotation of the clutch member 32 and, therefore, when the vertical oscillating movement of the arm 16 is small, the rotative movement of the clutch 32 and consequently the rotative movement of the drive shaft 33 will be less. Also, the greater the movement of the arm 16, the greater the rotative movement of the clutch 32 and the shaft 33 will be. The extent of the vertical movement of the arm 16, therefore, determines the amount of rotative movement of the clutch 32 and the shaft 33. The vertical oscillation of the member 16 is controlled by the position of the sleeve 26 on the rod 25. The closer the sleeve 26 is moved inwardly, the less rotative movement is given the shaft 33 and the farther the sleeve 26 is moved outwardly along the rod 25, the greater the rotative movement will be of the drive shaft 33.

In view of the flexible or resilient rod 45, the handle 52 may be operated any time to shift the nut-like member 53 within the bore 46 whereby the sleeve 26 may be shifted axially inwardly, or outwardly, along the reciprocating rod 25. The extent of the rotative movement of the drive shaft 33, therefore, determines the thickness that a slice will be cut by the slicing knife because the rotative movement of the shaft 33 determines the amount of feed of the gripper member 5. Each stroke of the oscillating arm 16 determines the amount of rotation of the drive shaft 33 and the amount of rotative movement of the drive shaft 33 determines the amount of travel of the chain 15 which drives the gripper 5. The reciprocating action of the horizontal arm 25 moving in a vertical arc therefore determines the amount of travel of the gripper 5, and the amount of travel of the gripper 5 determines the thickness of a slice to be cut from the substance. The shaft 33 is driven for forward feeding in one direction but during the other movement of the member 16, the shaft 33 will remain stationary. Constant reciprocation of the arm 25, which is transmitted to the vertical oscillating member 16, therefore determines the amount of movement of the gripper during each stroke or reciprocation of the arm 16, because the arm 16 drives in one direction and idles in the opposite direction. The rotative movement given to the rod 47 by turning the handle 52 on the disc 51, Fig. 3, therefore determines the amount of rotative movement which is going to be transmitted to the shaft 33 which in turn determines the amount of travel which is going to be transmitted to the gripper 5. The amount of intermittent forward movement of the gripper 5 therefore determines the thickness of the slice which will be cut from the substance by the slicing knife.

It is highly desirable that the thickness of a slice be known because it is necessary that a predetermined number of slices constitute a predetermined weight. For instance, standard pressed slabs of bacon of a certain width and thickness may amount to ten slices to the half pound. It is of great advantage, therefore, if the number of slices to constitute a given weight be determined. This determination is available when it is known how thick a slice should be cut. Means for showing the thickness of a slice, in accordance with the position of the sleeve 26, may readily be determined by the present invention by the use of a meter 60, such as an automatic counter, contained in the housing 48. This meter 60 operates very similar to the mileage meter on an automobile but instead of measuring the number of revolutions that an axle or the wheel travels, the translated movement of the sleeve 26 is measured by the number of rotations or part of a rotation given the flexible shaft 45. Therefore, each complete revolution of the shaft 47, and consequently the flexible shaft 45, will be registered on the metering device 60. As shown in Fig. 3, the register device 60 shows the number 85, which means that in accordance with the position of the sleeve 26 the slice will be of a predetermined known thickness. In actual practice, it has been found that one revolution of the shaft 47 will equal .041 to .001" of the actual bacon slice. For example, 1¾ revolution of the handle 52 will equal ¼ of an ounce where 20 slices are to constitute a pound in weight.

To determine exactly the amount or part of a revolution that is given or is to be given, the disc 51, Fig. 3, is provided with calibrations 61 cooperating with a pointer or indicating member 62, Fig. 3. The shaft 47 may be driven by an electric motor 63 instead of by hand, Fig. 2.

The invention, therefore, provides means for not only effecting the amount of movement which is to be driven by the gripper drive shaft means, but also determines the amount or number of rotations or part of rotation the flexible shaft 45 should be given in order to determine the thickness of a slice to provide a predetermined number of slices for a predetermined weight.

The device of the invention is relatively simple in construction. It is composed of few and simple parts which are not likely to get out of order and which may be easily and conveniently operated even though the machine is in full slicing operation.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is claimed as follows:

1. In a slicing machine having a knife shaft, a slicing knife mounted on said shaft, a pusher for feeding a substance to be sliced to said slicing knife, apparatus for incrementally advancing said pusher toward said slicing knife synchronously with the operation of said slicing knife, said apparatus including an adjusting device for varying the incremental advance of said pusher to thereby control the slice thickness of the substance to be sliced, said adjusting device being operable during operation of the slicing machine to vary the thickness of the slices, said adjusting device comprising a hollow rod operatively connected to said knife shaft and reciprocated through an arc thereby, a sleeve slidably mounted on said rod, an arm connected to said sleeve and oscillated thereby during reciprocation of said rod, a nut arranged within said rod for translation therein along the rod and operatively connected to said sleeve, and a threaded member extending within said rod and in threaded engagement with said nut, said threaded member being mounted on said rod for relative rotative movement but non-axial movement therewith, and a flexible shaft operatively connected to said threaded member for rotating said threaded member to effect translation of said nut, said sleeve and said arm to increase or decrease the vertical reciprocation of said arm thereby determining the amount of the incremental advance of said pusher and the slice thickness of the substance to be sliced, and drive means for rotating said flexible shaft.

2. In a slicing machine having a knife shaft, a slicing knife mounted on said shaft, a pusher for feeding a substance to be sliced to said slicing knife, apparatus for incrementally advancing said pusher toward said slicing knife synchronously with the operation of said slicing knife, said apparatus including an adjusting device for varying the incremental advance of said pusher to thereby control the slice thickness of the substance to be sliced, said adjusting device being operable during operation of the slicing machine to vary the thickness of the slices, said adjusting device comprising a hollow rod operatively connected to said knife shaft and reciprocated through an arc thereby, a sleeve slidably mounted on said rod, an arm connected to said sleeve and oscillated thereby during reciprocation of said rod, a nut arranged within said rod for translation therein along the rod and operatively connected to said sleeve, and a threaded member extending within said rod and in threaded engagement with said nut, said threaded member being mounted on said rod for relative rotative movement but non-axial movement therewith, and a flexible shaft operatively connected to said threaded member for rotating said threaded member to effect translation of said nut, said sleeve and said arm to increase or decrease the vertical reciprocation of said arm during rotation of said knife shaft thereby determining the amount of incremental advance of said pusher and the slice thickness of the substance to be sliced, drive means connected to the flexible shaft remote from the threaded member for rotating the flexible shaft, and a meter operatively connected to said flexible shaft responsive to rotation of said shaft, operative to indicate the selected thickness of the slices being sliced.

3. In a slicing machine having a knife shaft, a slicing knife mounted on said shaft, a pusher for feeding a substance to be sliced to said slicing knife, apparatus for incrementally advancing said pusher toward said slicing knife synchronously with the operation of said slicing knife, said apparatus including an adjusting device for varying the incremental advance of said pusher to thereby control the slice thickness of the substance to be sliced, said adjusting device being operable during operation of the slicing machine to vary the thickness of the slices, said adjusting device comprising a hollow rod operatively connected to said knife shaft and reciprocated through an arc thereby, a sleeve slidably mounted on said rod, an arm connected to said sleeve and oscillated thereby during reciprocation of said rod, a nut arranged within said rod for translation therein along the rod and operatively connected to said sleeve, and a threaded member extending within said rod and in threaded engagement with said nut, said threaded member being mounted on said rod for relative rotative movement but non-axial movement therewith, and a flexible shaft operatively connected to said threaded member for rotating said threaded member to effect translation of said nut, said sleeve and said arm during rotation of said knife shaft to increase or decrease the vertical reciprocation of said arm thereby determining the amount of incremental advance of said pusher and the slice thickness of the substance to be sliced, manually controlled drive means connected to the flexible shaft remote from the threaded member for rotating the flexible shaft, a meter operatively connected to said flexible shaft for visually showing the amount of movement effected by said pusher and thereby the thickness of a slice to be cut, and calibrated means for indicating the amount of rotational movement of said flexible shaft upon turning thereof.

References Cited in the file of this patent

UNITED STATES PATENTS

| | | |
|---|---|---|
| 1,022,751 | Packard | Apr. 9, 1912 |
| 1,045,582 | Messer | Nov. 26, 1912 |
| 1,624,895 | Reeves | Apr. 12, 1927 |
| 1,884,912 | Stukart | Oct. 25, 1932 |
| 1,976,824 | Ahrndt | Oct. 16, 1934 |
| 2,045,481 | Mahler | June 23, 1936 |
| 2,168,612 | Ahrndt | Aug. 8, 1939 |
| 2,245,352 | Moessinger | June 10, 1941 |
| 2,519,509 | Schrader | Aug. 22, 1950 |
| 2,538,619 | Friedman | Jan. 16, 1951 |

FOREIGN PATENTS

| | | |
|---|---|---|
| 24,791 | Norway | July 13, 1914 |